Feb. 2, 1965 J. A. HARDMAN 3,168,047
VOLUME DISPLACEMENT MEANS WITH SLEEVE VALVE CONTROL
Filed Sept. 25, 1962 9 Sheets-Sheet 1
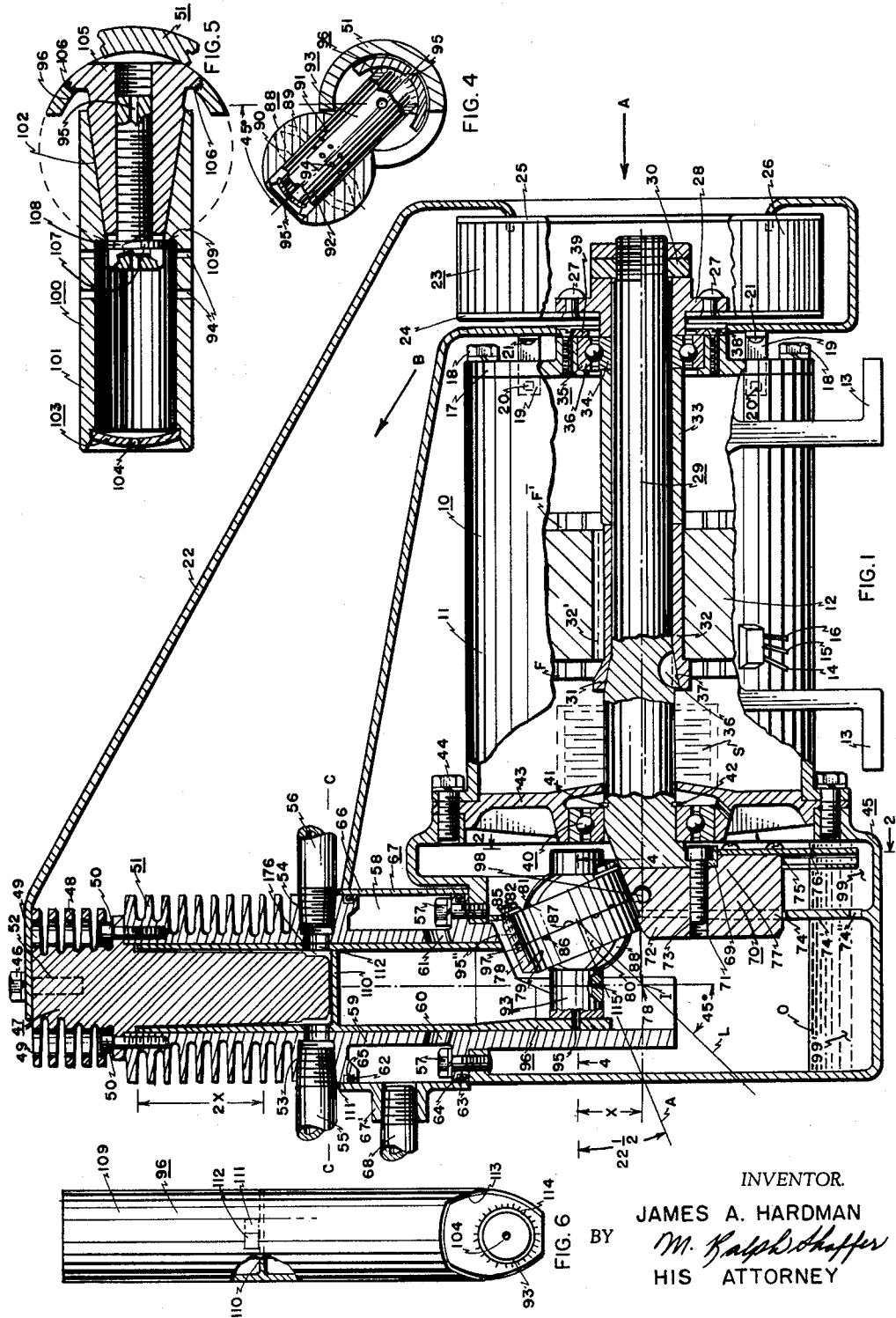
INVENTOR.
JAMES A. HARDMAN
BY M. Ralph Shaffer
HIS ATTORNEY

INVENTOR.
JAMES A. HARDMAN
BY
HIS ATTORNEY

Feb. 2, 1965 J. A. HARDMAN 3,168,047
VOLUME DISPLACEMENT MEANS WITH SLEEVE VALVE CONTROL
Filed Sept. 25, 1962 9 Sheets-Sheet 3

TDC

INVENTOR.
JAMES A. HARDMAN
BY
HIS ATTORNEY

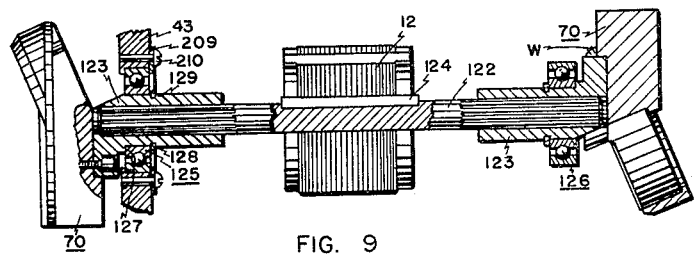
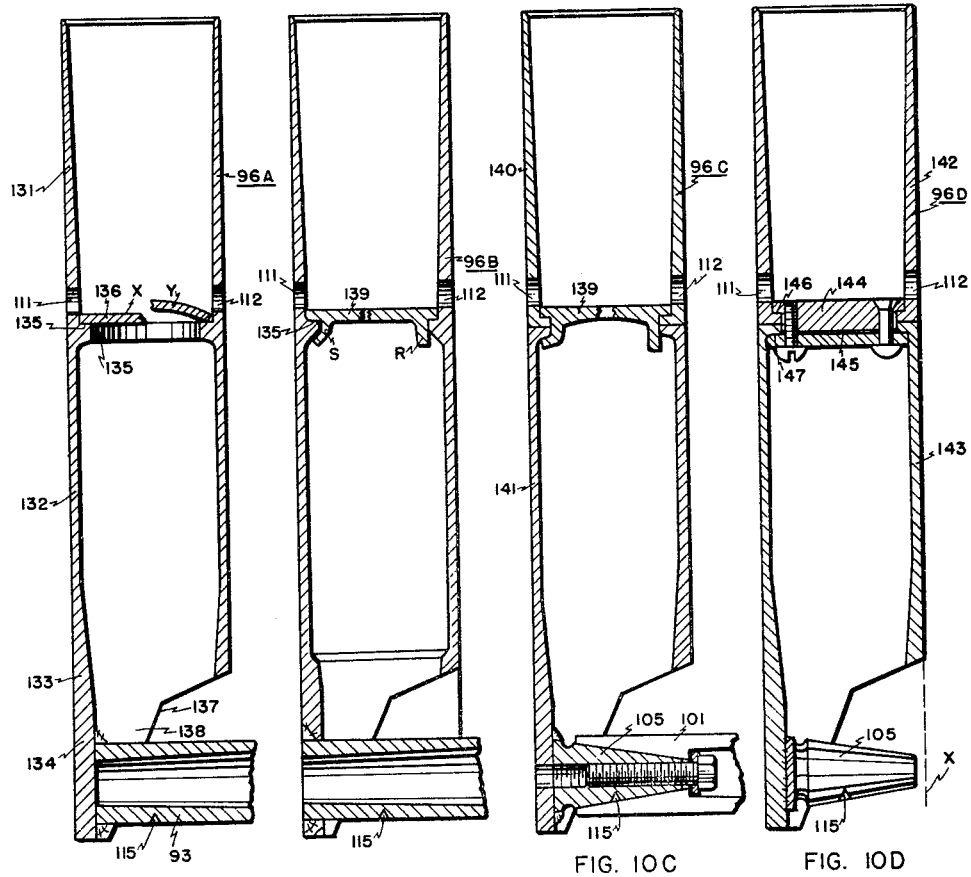

Feb. 2, 1965   J. A. HARDMAN   3,168,047
VOLUME DISPLACEMENT MEANS WITH SLEEVE VALVE CONTROL
Filed Sept. 25, 1962   9 Sheets-Sheet 5

INVENTOR.
JAMES A. HARDMAN
BY M. Ralph Shaffer
HIS ATTORNEY

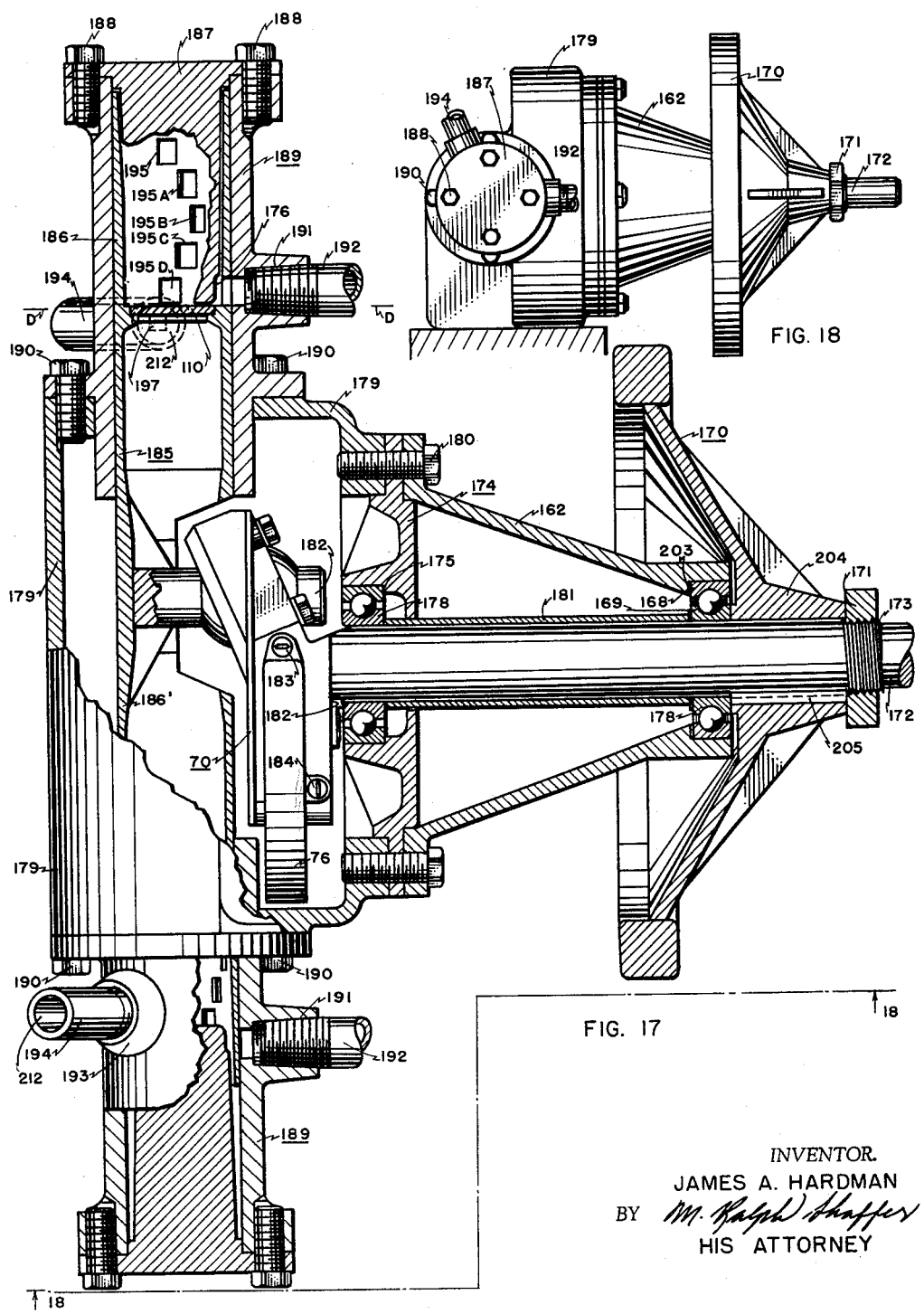

Feb. 2, 1965   J. A. HARDMAN   3,168,047
VOLUME DISPLACEMENT MEANS WITH SLEEVE VALVE CONTROL
Filed Sept. 25, 1962   9 Sheets-Sheet 7

INVENTOR.
JAMES A. HARDMAN
BY M. Ralph Shaffer
HIS ATTORNEY

INVENTOR.
JAMES A. HARDMAN
BY
HIS ATTORNEY

INVENTOR.
JAMES A. HARDMAN
BY M. Ralph Shaffer
HIS ATTORNEY 3,168,047
Patented Feb. 2, 1965

3,168,047
VOLUME DISPLACEMENT MEANS WITH SLEEVE VALVE CONTROL
James A. Hardman, 225 West 4th North, Logan, Utah
Filed Sept. 25, 1962, Ser. No. 227,630
18 Claims. (Cl. 103—57)

The present invention relates to volume displacement apparatus including fluid pumps, compressors of gaseous material, and fluid driven prime movers such as fluid driven motors and fluid-driven motor-generator combinations and, more particularly, to new and improved volume displacement means wherein the operative phenomena thereof are effected by sleeve valve control of the fluid used to drive the volume displacement means or to be conditioned thereby.

Heretofore, valve control has presented major problems in connection with volume displacement equipment. Though somewhat satisfactory, and conventional in use with respect to internal combustion engines, the employment of poppet valves in volume displacement pumps and, particularly, in compressors, has been found very expensive and highly unsatisfactory to use. As to the latter, in order for poppet valves to open at top-dead-center position, the same will have to be controlled from a region exterior of the cylinder and hence will drop down from the cylinder head in order that the gaseous material may be expelled. This necessitates an operating clearance at the top of the cylinder for poppet valve operation and, consequently, such results in an increase in the unexpelled volume of gases from the cylinder so that compressor efficiency is reduced. Because of this unexpelled volume problem, poppet valves are seldom used in mechanically operated pumps and compressors at the present time.

What are conventionally used in pumps and air compressors, for example, are valves known as "reed" valves and "plate" valves. The reed valve simply takes the form of a sheet metal, spring steel reed which is secured at one end and the width of which is sufficient to cover the orifice in the cylinder head, for example. The plate valve is similar in construction but is unsecured save for general employment in a slot or guide configuration over the exhaust orifice of the cylinder. Special cases of plate valve employment have utilized auxiliary springs thereover.

The following explanation will apply to both reed and plate valves, although the reed valves will be discussed in detail for purposes of example.

It is elementary that the reed valve must, of necessity, overlap the exhaust orifice of the cylinder some nominal distance one-half the order of, say, $\frac{1}{16}$ of an inch or greater. The overlap, of course, will be greater as the hole size is enlarged as to diameter. Further, the reed will have to be secured at one end and hence must be elongated relative to the center of the cylinder orifice. Thus, considering compressors of a size of ten horsepower or less, by way of example, the total force of the expelled gases or air on the top surface of the reed will be appreciable and, indeed, will tend to build up as the surface area of the reed is increased. This means that the pressure of gases to be expelled from the cylinder must of necessity be greatly increased in order to counter-act the back pressure (i.e. the pressure of the expelled gases on the top surface of the reed) so that the reed may be opened. Merely by way of example, the cross-sectional area of a one-half inch diameter cylinder exhaust orifice is .1964 square inch. The area of a ⅝ inch diameter reed or plate, neglecting any elongation thereof, is a .3086 square inch. Thus, and neglecting any elongated area in the valve employed, it may be seen that the pressure of the gases to be expelled from the cylinder must be almost twice that of the exhaust gases bearing on the top surface of the reed. This figure may be substantially exceeded when the elongation of the reed is considered, and yet such supplies only a one-sixteenth inch overlap of the reed relative to the orifice. The same analogy will apply to plate valves even though they are unsecured at one end thereof (in contrast with the reed valve). It is thus seen that the efficiency of conventional compressors using either reed or plate valves is markedly reduced by the valving thereof. Since, therefore, in conventional compressors the operating pressures within the cylinders must be high, excessively so to accommodate valving, there naturally results a tremendous adiabatic rise in temperature which causes a heat dissipation problem in addition to the problem of carbonizing the lubricants used, by virtue of the heat present. It would obviously be of great advantage if the horsepower necessary to drive a compressor or pump could be reduced, both for purposes of conservation of energy and also for insuring optimum operation of the pump or compressor and otherwise prevent its malfunctioning through inability to dissipate excessive heat, and so forth.

Another problem hitherto encountered is the limitation imposed by valving in conventional pumps and compressors upon speed of operation of the compressor or pumps. Speeds of over one thousand revolutions per minute in such equipment are unusual, owing to the inability of the valving to perform at higher speeds.

It is common knowledge that internal combustion engines may operate as much as five times or more the speed of the compressor which it is driving; hence, generally required will be some type of gear reduction system so that the compressor may be accommodated for by the engine or motor driving the same.

The present invention corrects the above objections in virtually eliminating unexpelled volume, in keeping to a minimum temperature rise in the operating cylinders, and yet provides a much enlarged overlap during valve seal-off condition which occurs during the operating cycle.

Accordingly, principal objects of the present invention are:

To provide a simple, inexpensive and easily maintained displacement pump, compressor, or prime mover having a high degree of efficiency and capable of high speed operation;

To provide a volume displacement means wherein the increased speed in revolutions per minute can be obtained notwithstanding a consequent reduction in over-all size of the equipment for the same volume of pumping or power produced;

To provide for the removing and replacing of all parts which sustain wear so that perpetual, easy maintenance is possible;

To provide a reciprocating and simultaneously revolving piston in a piston and cylinder construction the combination of which automatically accomplishes necessary valving functions without the necessity of employing auxiliary reed, plate or poppet valving;

To provide a design in which initial costs of casting patterns, machining, tooling and manufacturing facilities are minimal;

To provide volume displacement means capable of sufficiently high speeds as to circumvent the need for piston rings, thus eliminating consequent wear, power loss and lubricant contamination which would otherwise be present;

To provide a hardened and ground, steel sleeve-type piston construction in the volume displacement means of the invention, to eliminate wear, to make possible the reduction of reciprocating weight, and to provide a highly efficient wear surface between the piston and cylinder wall;

To effect a highly efficient distribution of oil film between the piston and cylinder wall by utilizing the lapping or rolling motion of the reciprocating piston with respect to the cylinder wall to distribute the oil film;

To provide a highly efficient oil film heat transfer between the piston and cylinder wall so as to make possible a minimum clearance between the piston and cylinder areas to accommodate heat expansion of the cylinder wall, thereby insuring a close, well-lubricated, operating fit;

To provide for a multiple of cylinders spaced apart from each other and from their drive motor so as to accommodate access around each cylinder and said motor for adequate cooling;

To provide multiple cylinders which can have variations of bore and stroke difference for multi-stage, pump work especially, and to associate these with a simple motor drive or other power source;

To provide cylinders of substantially uniform, circumferential section and of independent location so that expansion is uniform and is not restricted by integral multiple bores in a common block, for such will avoid distortion in bore circle caused by successive temperature changes and interference of expansion as are encountered in integral, multi-cylinder constructions;

To provide by the rolling motion of the reciprocating piston in the subject volume displacement means uniform wear distribution, to avoid elliptical wear distortion of the cylinder and piston;

To provide variable leverage between a reciprocating and rotating piston and the motion transforming means which couples the same to a revolving shaft such that greatest leverage for piston revolvement occurs at mid-stroke and least piston side-thrust occurs at stroke extremities where the loads are the greatest;

To provide a long sleeve piston construction and close, single arm input drive therefor, to reduce to a minimum the off-set or sidewall thrust of the piston against the cylinder wall;

To provide a lower partial skirt extension on the back side of the cylinder, of the subject volume displacement means, to facilitate the proper control of the piston and to eliminate the possibility of any small area of high thrust forces which would cause wear;

To provide a very light reciprocating mass in the subject piston, cylinder construction so that vibration can be acceptably controlled by appropriate counterweight on one rotor;

To provide a very simple, light, portable, self-contained pump which can be used as an air compressor or vacuum pump;

To provide in the volume displacement means of the present invention suitable continuous, ample lubrication of the motion transforming means thereof and yet isolate the piston and cylinder construction of the volume displacement means from the turbulence present at said motion transforming means so as to avoid excessive lubrication of said piston within said cylinder;

To provide an exhaust port facility in the subject volume displacement means which has diametrically opposed piston ports to avoid side wall thrust of the piston resulting from back pressure of the pumped air in a compressor or the drive medium in a prime mover application;

To provide for constant change of location on the piston in a volume displacement means where the hot expelled air will bear against the piston wall, thereby avoiding localized heat and distortion of the openings used for the valving function;

To provide in the subject volume displacement means for maximum available, separation between piston and cylinder openings so as to maintain high pumping efficiency through the absence of valve leakage;

To provide in the subject volume displacement means a very high volumetric efficiency by reducing to a minimum the unexpelled volume from each stroke;

To provide in the subject volume displacement means the same piston skirt openings to effect the intake as well as the exhaust openings in the piston skirt;

To provide in the subject volume displacement means multiple intake holes in the pump cylinder for ease of construction and to avoid distortion from large section cutaways in the cylinder wall;

To provide in the subject volume displacement means multiple intake holes in the pump cylinder wall so as to avoid a slot which might catch on revolving honing stones during cylinder fabrication;

To provide in the subject volume displacement means a composite, stub shaft construction such that the sleeve or wear portion thereof may be removed so that the piston may be ground without interference therewith, thereby enabling one to hold uniformity in the piston's ground surface throughout its entire length;

To enable in the subject volume displacement means a desired discharge timing on successive pistons of multiple cylinders to dampen line surge;

To provide in the subject volume displacement means a sealed pumping unit which is integral with its motor and yet sealed-off at its shaft;

To provide in the subject volume displacement means cross-flow from end to end of a motor provided with single acting pistons on each end of its through shaft, to avoid internal pressure, and also to effect air transfer from side to side to assist heat dissipation from motor windings;

To provide in the subject volume displacement means a pump for pumping food products where easy cleanup is possible because of simple construction of piston;

To provide in the subject volume displacement means an extremely simple design where no adjustment or assembly problems require special tools or skills;

To provide in the subject volume displacement means a simple design where use of a slightly oversize piston could be installed and the worn cylinder simply rehoned;

To provide a piston, piston shaft, cylinder construction wherein the cylinder need not necessarily be in exact right angle relationship and where reciprocating and rotary axes need not necessarily be exactly intersecting; this greatly reduces all machining tolerances of the cylinder and housing construction;

To provide in the subject volume displacement means an extended cylinder skirt with well over half-circle extent in order to cup the piston thereof and extend guide characteristics of cylinder to control the piston;

To provide in the volume displacement means of the present invention a motion transforming means incorporating a ball and a piston stub shaft journaled therein and nominally connected at right angles to its piston, with the piston stub shaft being both rotatable within and translatable through said ball, thereby reducing to a minimum translation drag of said stub shaft and corresponding drag of the piston to which it is connected;

To provide in the volume displacement means of the present invention a finned extension of the cylinder displacement plug therein to assist in cooling the plug, or to provide coolant circulation through such plug;

To provide in the subject volume displacement means one motor and one or more cylinders as a refrigerant pump where the entire unit can be sealed to prevent loss of refrigerant;

To provide in the subject volume displacement means simple connection means for the removal of the pump housing thereof and its associated rotor from either end of the motor thereof, for repair and maintenance purposes;

To provide in the subject volume displacement means for the interconnection of one, two, or four single acting steam cylinders, for example, to one generator as an electrical power source;

To provide in the volume displacement means of the present invention a piston and cylinder construction wherein the piston intake ports sweep over their respective cylinder intake orifices on down-stroke and then sweep to midway position therebetween during the up-stroke preparatory for exhaust;

To provide in the volume displacement means of the present invention a revolving and reciprocating piston construction operating in a cylinder, wherein the piston is provided with a series of intake ports on one side and a series of exhaust ports on the opposite side thereof, to respectively register sequentially on intake down-stroke and then on upstroke exhaust with cylinder intake orifices on one side and cylinder exhaust orifices on the other side;

To provide, in general, a volume displacement means adapted to perform useful work, either in pumping non-compressible materials such as liquid, compressing compressible materials such as air and other gases, driving a rotatable shaft by means of either compressible materials or non-compressible materials introduced therein, and by serving as a motor-generator of electrical power, this being effected by the introduction therein of compressible materials or non-compressible materials under pressure, context of usage dictating porting patterns and slight deviation in cylinder and piston construction;

To provide in volume displacement apparatus a sleeve porting construction which is adapted for one of a number of uses such as pumps, compressors, motors and motor generators, this depending upon the porting employed, and the construction being adapted for incorporating single, plural, or multiple cylinder constructions bearing any desired mutual relationship;

To provide in a piston and cylinder construction an oil bath compartment which is suitably baffled, as by a partition containing suitable metering hole means, such that the piston and cylinder have a quiet environment, present on one side of the baffle, which is free of lubricant turbulence notwithstanding the possible generation of the same on the remaining side thereof as may follow by the employment of means thereat to amply lubricate an articulative drive or driven connection to said piston through which the latter is properly lubricated;

To provide a centrifugally pressurized, lubricant feed to the eccentric, articulated journal of a revolving rotor.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing in which:

FIGURE 1 is a side elevation, shown principally in section and cut-away for convenience of illustration, of one form of the present invention wherein a motor is employed to drive a single cylinder construction, the unit shown conveniently serving as a single-stage compressor; also shown is optionally included cooling means keyed to the motor and which may be employed to direct cooling air across the cylinder construction.

FIGURE 4 is a detail section taken along the line 4—4 in FIGURE 1 of the stub shaft or connecting means journaled within the ball of the rotor construction and secured to the piston which it reciprocates, and is taken at displaced position relative to rotation and at midstroke position within the associated cylinder.

FIGURE 5 is an enlarged detail, principally in section, of an optional stub shaft and piston construction which may be used in practicing the present invention.

FIGURE 6 is a side elevation of the piston employed in FIGURE 1 and is rotated 90° in a clockwise direction, looking down with reference to FIGURE 1; the piston is slightly cut-away to indicate a medial partition employed therein, and substantially diametrically opposed ports are indicated in the piston wall above the partition.

Figure 7:
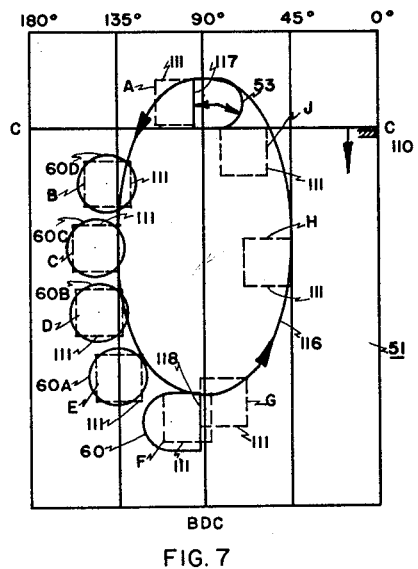

FIGURE 7 is a porting diagram relating to the porting of the piston and cylinder construction of FIGURE 1; in particular, FIGURE 7 shows a roll-out of a representative half (180°) of the cylinder superimposed over a representative half of the associated piston rolled out and disposed underneath the former; solid circular lines indicate cylinder orifices, and dotted square lines indicate piston ports.

Figure 8:
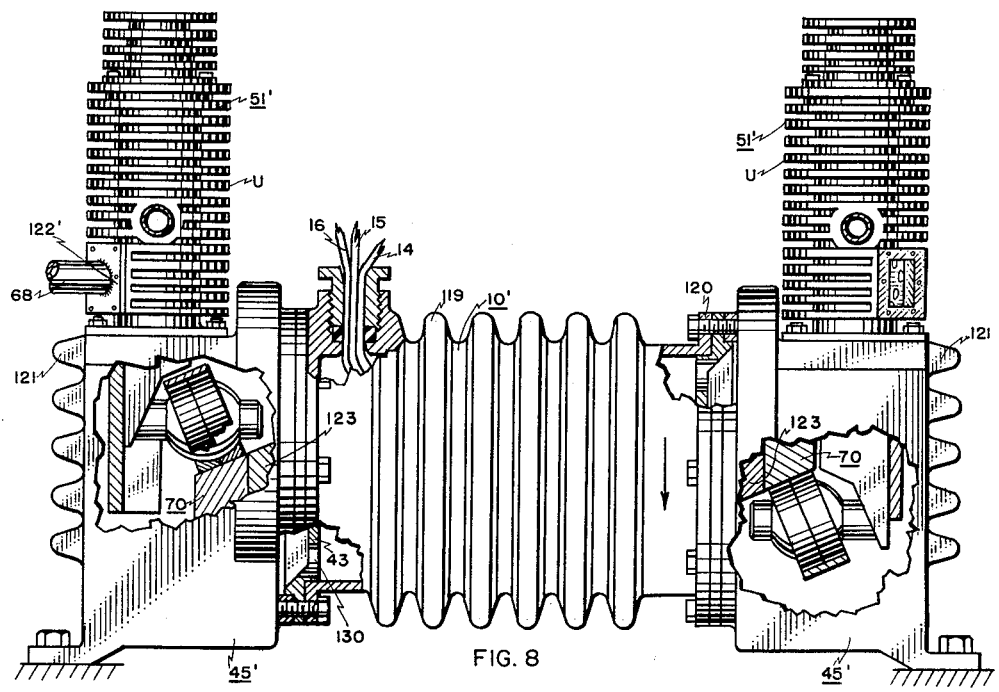

FIGURE 8 illustrates a two-cylinder motor construction wherein it is seen that the motor may drive a pair of cylinders from opposite ends of the motor shaft; this illustrates a two-cylinder compressor construction; for convenience of illustration certain portions of the drawing are in section and broken away for clarity.

FIGURE 9 is a detail principally in section of the motor shaft which may form a part of the motor in FIGURE 8; journal mounts are illustrated for the motor shaft and associated rotors of the compressor units in one illustrative embodiment of the invention.

FIGURES 10A through 10D are enlarged vertical sections of respective piston and stub shaft constructions which may be employed in the present invention; these figures illustrate various ways in which the stub shafts may be welded to their associated pistons, various configurations of stub shaft, and also various means by which a medial partition may be supplied each of the pistons intermediate their respective extremities.

Figure 11:
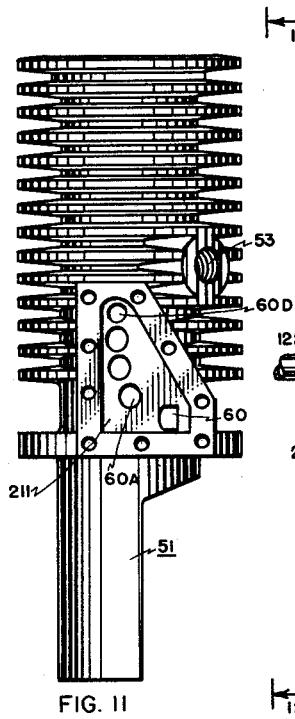

FIGURE 11 is a side elevation of a cylinder which may be employed in the construction as shown in FIGURES 1 and 8; the mounting boss, only, is illustrated in a slightly different configurement.

Figure 12:
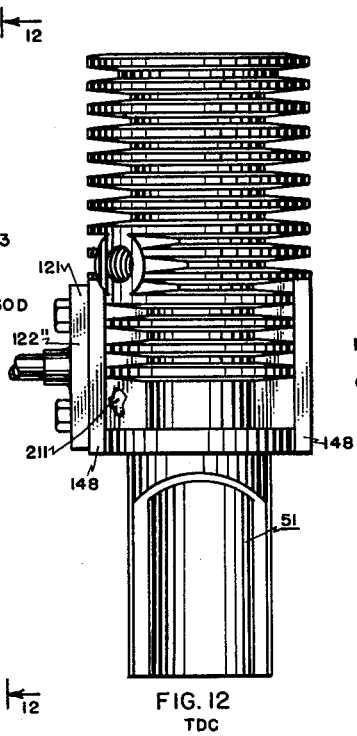

FIGURE 12 is an elevation taken along the line 12—12 in FIGURE 11; FIGURE 12 illustrates that diametrically opposed mounting bosses may be used in the cylinder construction.

Figure 13:
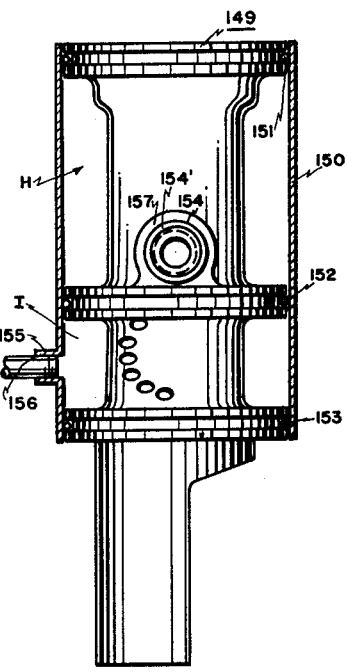

FIGURE 13 is an elevation, somewhat in section, of an alternate cylinder construction which may be employed in the present invention; this time, a water jacket construction is utilized with the cylinder in lieu of the cooling fins shown in FIGURES 11 and 12.

Figure 14:
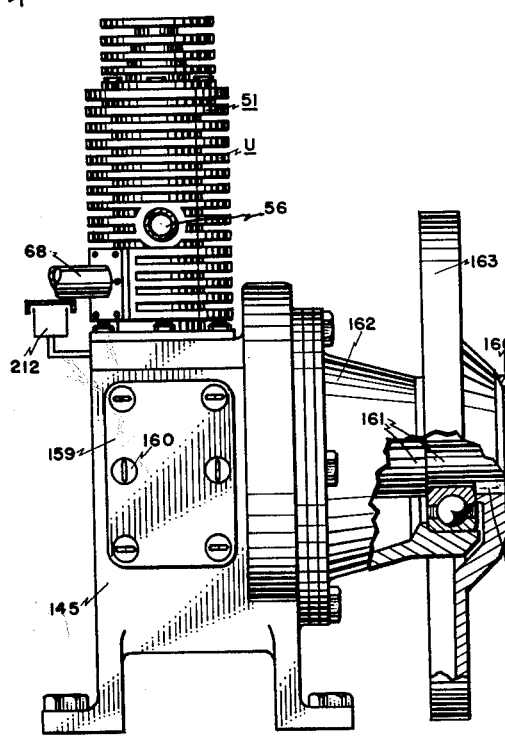

FIGURE 14 is a side elevation of a cylinder compressor construction wherein the same is driven by V-belt means from an external power source; FIGURE 14 is slightly broken away to illustrate the shaft mounting in the flange construction.

Figure 15:
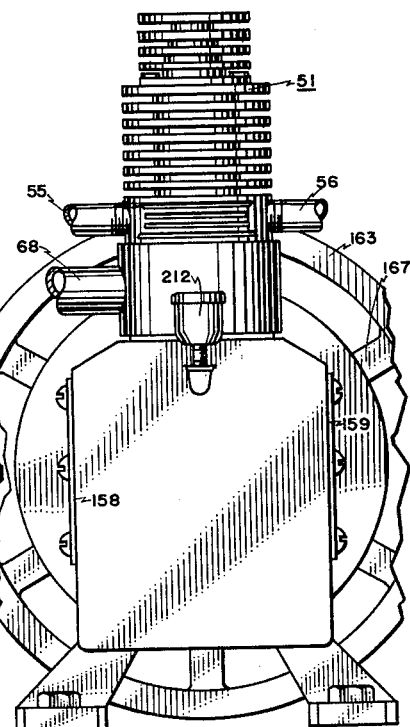

FIGURE 15 is a back view taken along the line 15—15 in FIGURE 14 and is slightly broken away at the flywheel for convenience of illustration.

Figure 16:
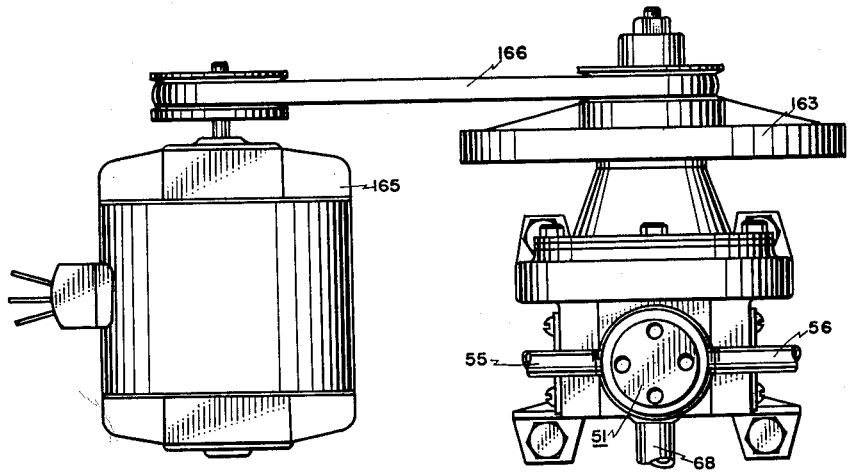

FIGURE 16 is a plan view of the structure illustrated in FIGURE 14 and is rotated 90° in a counter-clockwise direction.

FIGURE 17 is a plan view, partially broken away and principally in section, of an opposed cylinder and integral piston construction which may be employed in practicing the present invention; the composite opposed cylinder construction as shown includes a single central shaft drive which is provided with a fly-wheel and which may be driven by an external source; as illustrated in the upper part of the figure there will be a unique porting configurement relative to the piston and cylinder construction at both ends thereof so that the unit shown in FIGURE 17 may be used either to pump liquids or other non-compressible materials, or the shaft thereof may be driven by the injection into the cylinder construction of either compressible or non-compressible materials.

FIGURE 18 is a side elevation of the structure shown in FIGURE 17 and is taken along the lines 18—18; however, the structure in FIGURE 18 is shown in reduced scale relative to that shown in FIGURE 17.

Figure 19:
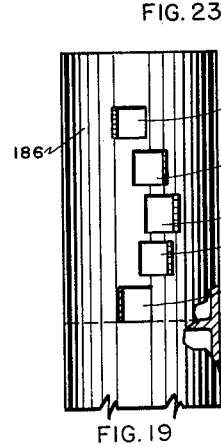
Figure 20:
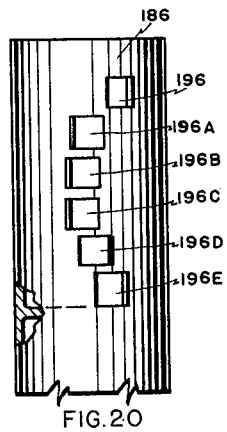

FIGURES 19 and 20 are elevations of opposite sides, respectively, of the upper portions of the piston shown in FIGURE 17; FIGURE 19 illustrates the sweep configurement of the piston intake ports, and FIGURE 20 illustrates the reverse sweep configurement of the piston exhaust ports.

FIGURES 21 through 24 illustrate 360° overlay roll-outs of the piston, opposite sides of which are shown in FIGURES 19 and 20, over the cylinder; the cylinder orifices are indicated in dotted lines which register sequentially with respective series of piston intake and exhaust ports.

Figure 21:
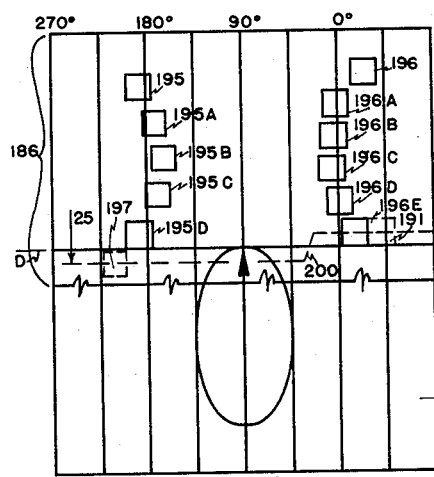
Figure 23:
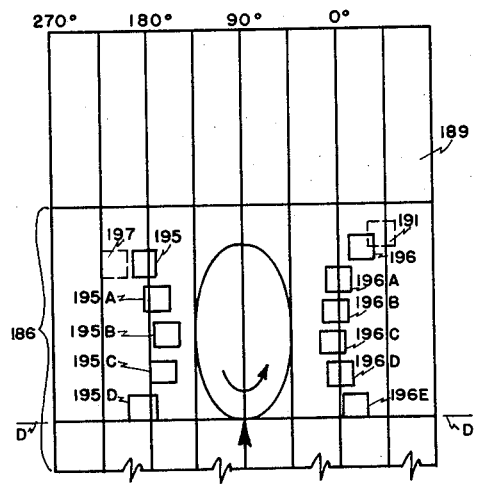
Figure 24:
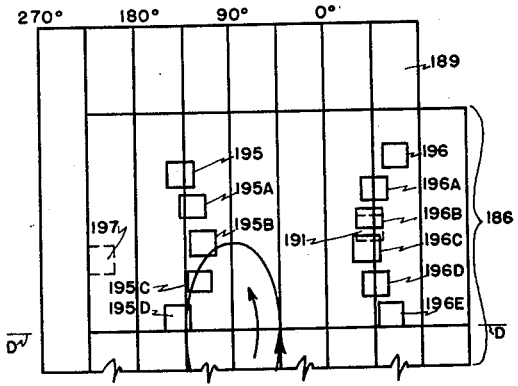
Figure 25:
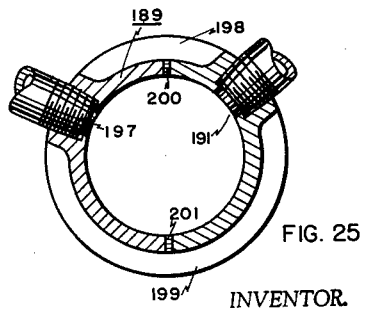

FIGURE 25 is an enlarged, horizontal section of the cylinder construction accommodating the piston shown in FIGURES 19, 20 and 17, and illustrated in roll-out pattern in FIGURES 21 through 24, and is taken along the line 25—25 in FIGURE 21.

Figure 26:
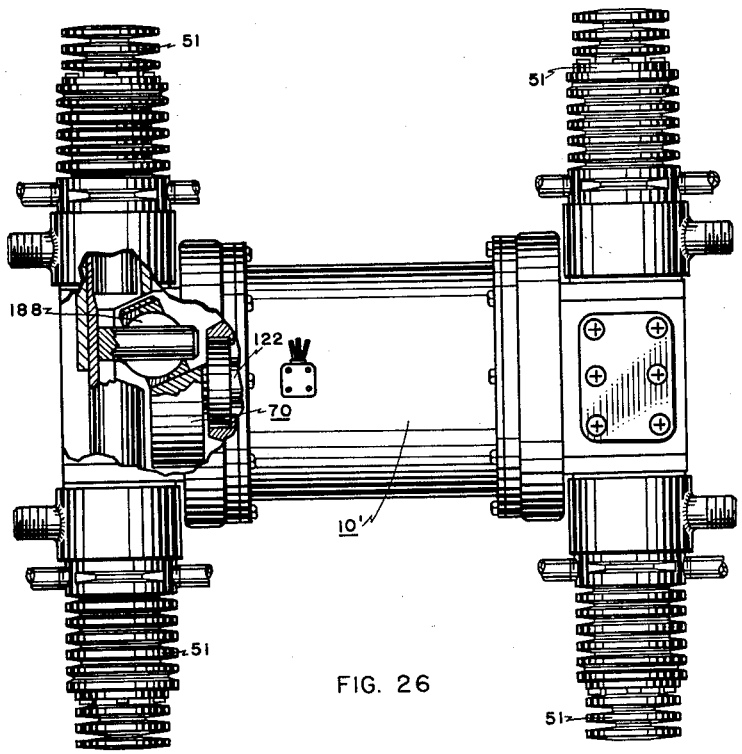

FIGURE 26 is a plan view of structure according to yet another form of the invention wherein a pair of opposed piston and cylinder constructions, similar to that shown in FIGURE 17, are disposed on opposite sides of a driving motor and are keyed to the opposite ends of the shaft thereof; for convenience of illustration a portion of the structure in FIGURE 26 is broken away and sectioned, to show the center portion of operationally opposed pistons.

Figure 27:
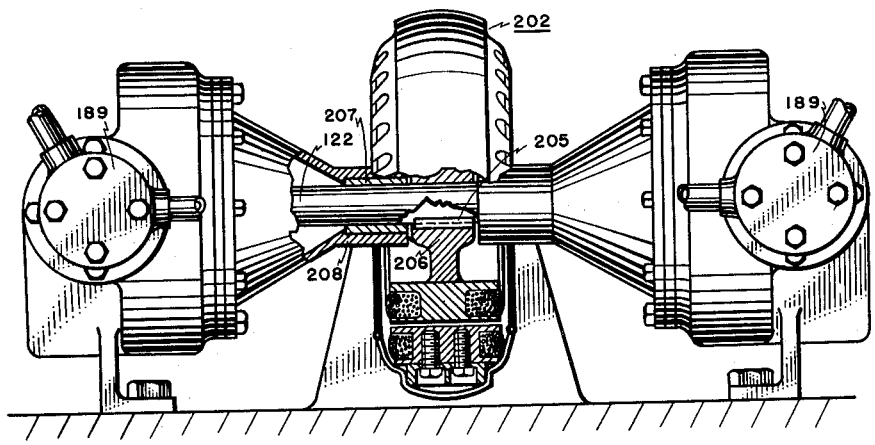

FIGURE 27 is a side elevation, partially broken away in section for convenience of illustration, of yet another form of the invention wherein a pair of opposed cylinder constructions are employed to drive an electric generator.

Figure 28:
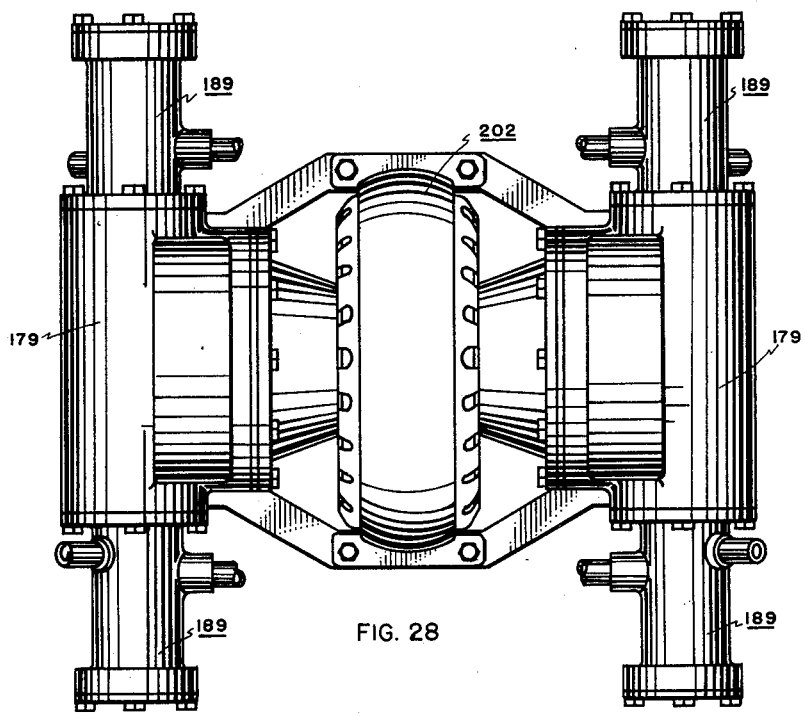

FIGURE 28 is a plan of the structure shown in FIGURE 27, but is shown in reduced scale.

Figure 29:
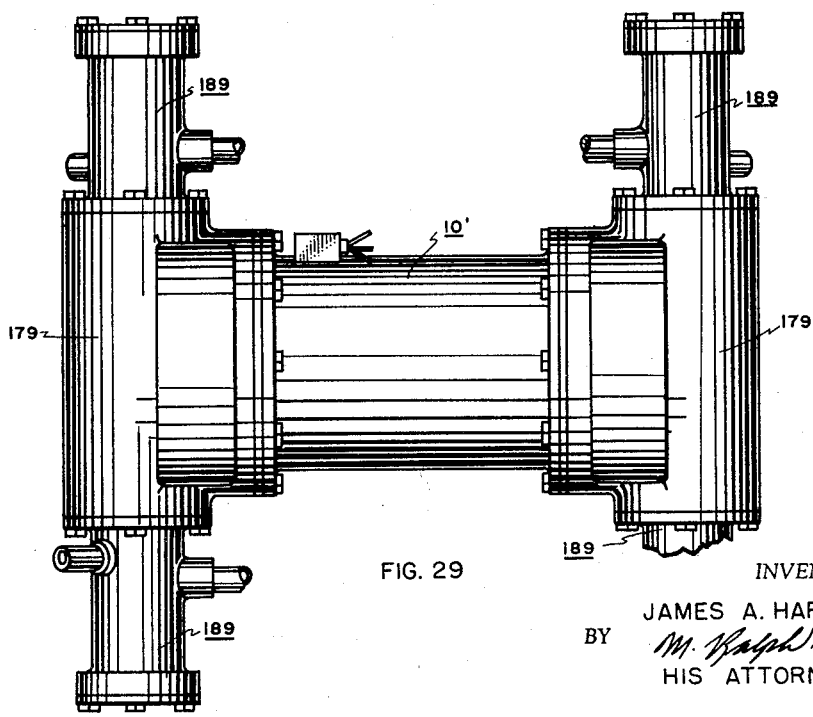

FIGURE 29 is a plan view of structure similar to that shown in FIGURE 26, however, illustrates that cylinders similar to those shown in FIGURE 17, the porting of which is illustrated in FIGURES 21 through 24, may be used in lieu of the cylinders of FIGURE 26, which resemble those shown in FIGURE 1, to perform a fluid pumping requirement.

In FIGURE 1 motor 10 includes housing 11, rotor 12 journaled therewithin and mounting footings 13 secured to housing 11. The motor 10 is, in general, of conventional construction having input leads 14, 15, and 16 for three-wire connection, if desired. Backing plate 17 is bolted by capscrews 18 to the motor housing 11. Mounting brackets 19 are secured to the motor housing 11 by capscrews or other suitable means 20 and are riveted or otherwise secured at 21 to the air-directing shroud horn 22. Fan 23 includes backing disc 24 and ring 25 mutually spaced from the former to receive therebetween scalloped fins 26 which are welded or otherwise secured thereto. The fan construction is strictly conventional. Disc 24 of fan 23 is riveted by rivets 27 to the fan mounting hub 28, and the latter circumscribes motor shaft 29 and is held in place by locking nuts 30 tightened down thereon. It will be noted that motor shaft 29 is tapered at 31, and that the same receives a sleeve 32 pressed into rotor 12 and keyed thereto at 32', a spacer sleeve 33, and the inner race 34 of bearing 35. Woodruff key 36 is disposed in shaft 29 to which is keyed the shaft receiving sleeve 32 by the slot 37 thereof receiving Woodruff key 36. It will be noted from the foregoing that the fan mounting hub 28 is in essence keyed to the motor shaft 29 by virtue of the keyed sleeve 32 and the thrust imposed thereon by the combination of spacer sleeve 33, the inner race 34 of bearing 35 and the tightening down upon the hub 28 by lock nuts 30. Screws 38 secure bearing retainer plate 39 to backing plate 17 so as to fix the outer race 36 of bearing 35. It will be noted that since the carrier bearing is fixed as to both inner and outer races thereof, the remaining carrier bearing 40 is left free to float, albeit the same is nominally positioned by retainer ring 41 which is disposed within groove 42 of shaft 29. Carrier bearing 40 journals the shaft 29 to the carrier mounting flange 43 the latter of which is bolted into position by bolts 44 to motor housing 11 and to pump housing 45.

In addition to being secured to the motor backing plate 17, the cooling-air directing shroud horn 22 is provided bolt attachments 46 for mounting the shroud 22 to displacement plug 47. The latter has a plurality of cooling fins 48 and also mounting apertures 49 for receiving capscrews 50 to thread into cylinder 51. The top of displacement plug 47 will of course be drilled and tapped as at 52 to receive bolt attachment 46. Other means of attaching the shroud to the displacement plug will be obvious.

Cylinder 51 is supplied with outlet orifices 53 and 54 which receive conduits, unions, or other fluid communicating means 55 and 56. Cylinder 51 is bolted by a bolt means 57 to the pump housing 45. Cylinder 51 is relieved at area 58, and the wall portion 59 thereof is provided with fluid intake orifices 60 and 61. O-rings 62 and 63 are provided grooves 64 and 65 in cylinder 51 so as to retain and seal appropriately a bossed sleeve 67, the latter having boss 67' receiving conduit or other fluid communicating means 68.

Figure 2:
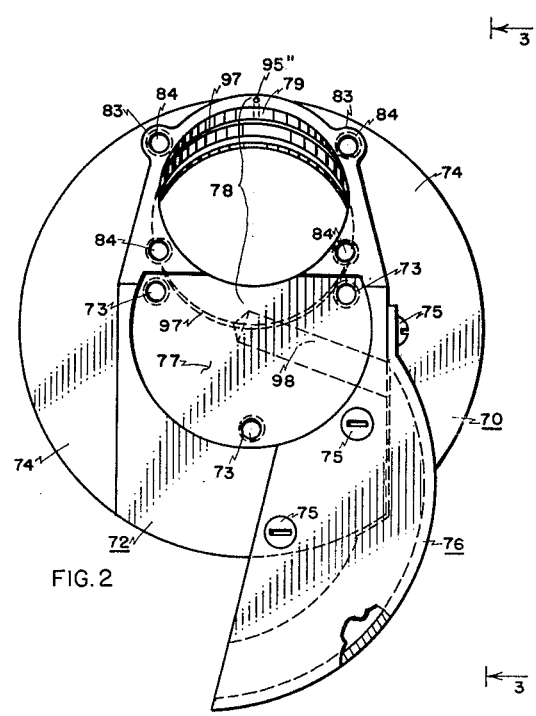
FIGURE 2 is a view taken along the line 2—2 in FIGURE 1 and constitutes a back view of the rotor construction employed in one form of the invention; for convenience of illustration the socket halves and ball of the rotor is illustrated in FIGURE 1 are removed in FIGURE 2.
Figure 3:
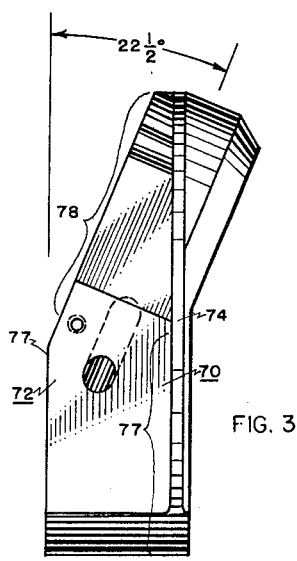
FIGURE 3 is a side elevation of the rotor structure as shown in FIGURE 2 and is taken along the line 3—3 in FIGURE 2; for convenience of illustration the lubricant scoop of FIGURE 2 is removed in FIGURE 3.

Flange 69 of motor shaft 29 is secured to rotor 70 by means of capscrews 71 one of which is illustrated in FIGURE 1. The rotor 70 includes a rotor member 72 which is drilled and tapped at 73 in a desired number of places for receiving a desired number of capscrews 71. FIGURES 2 and 3 also illustrate the configuration of rotor 70. Advantageously provided is a peripheral fin 74 (see also FIGURE 2) which is integral with or otherwise secured to rotor member 72. This oil control fin 74 rotates within a mating stationary housing fin 74', disposed in matching relationship to rotating fin 74, to isolate the turbulence caused by the oil scoop 76 from the compartment beneath the cylinder and piston assembly. Area 99 receives its oil supply from area 99' through orifice 74''. Mounted to the rotor member 72 by means of screws 75 is an oil scoop 76.

The rotor member 72 includes a rotor shaft, flange mounting portion 77 and a socket receiving portion 78 the latter of which is disposed at an angle of 22½° relative to the former. To provide optimum available surface area of the piston and cylinder for porting of widest seal-overlap characteristics, it is necessary that the desired half-stroke distance X be determined, that the intersection I of the piston and motor shaft axes be determined, that a 45° line L be drawn from I to determine the position of ball 88 for a distance X at top-dead center position, and, finally, that the axis A the ball's socket be at an angle of 22½° relative to line L, as shown. The motor (rotor) shaft and piston axes should be in nominal, 90° relationship, although deviations therefrom are automatically compensated for by the inherent characteristics in the apparatus, i.e. by virtue of the rotor's articulated connection with stub shaft 93.

Socket receiving portion 78 includes a shouldered mounting aperture 79 which receives socket halves 80 and 81 which are tightly secured therewithin by capscrews 82. These capscrews 82 are threaded into screw mounting boss 83 (see FIGURE 2) which is drilled and tapped at 84, the washers 85 serving under the pressure of the capscrews 82 to tightly retain the socket halves 80 and 81 in place. Socket halves 80 and 81 are supplied apertures 86 and 87 for supplying oil lubrication to the contained spherical ball 88 thereof. Ball 88 in FIGURE 4 is shown to include a plurality of oil admittance apertures 89 and 90 which communicate with the inner surface of bore 91 of the ball and the exterior surface 92 of stub shaft or connecting means 93. The stub shaft or connecting means 93 is thus seen to be revolvingly and slideably received by rotor 70 at the latter's eccentrically disposed ball, and socket, in an articulated connection.

Stub shaft 93 likewise includes oil admittance apertures 94 which communicate to the hollow center of the stub shaft with the oil passing therethrough to be directed toward and through orifice 95 of piston 96. As illustrated in FIGURES 1 and 4, in particular, it is seen that the stub shaft 93 is welded or otherwise made integral with piston 96. An orifice 95', somewhat smaller than orifice 95, is provided in the outer end of stub shaft 93 to prevent a sludge buildup within its hollow center as a result of the centrifugal sweep of the stub shaft. A similar sludge relief hole 95'' is placed at the outside of socket 78 to keep annular groove 97 free from sludge. Orifice 95 may be considered as a metered, lubricating orifice, supplying a film of oil lubricant on the inner surface of cylinder 51 at its surface engagement with piston 96. Because of the rolling sweep of the piston, oil will be distributed to the contacting surfaces of the piston and cylinder walls.

For a detailed consideration of the bearing lubrication of ball 88 the reader is respectfully referred to the inventor's co-pending case, entitled Fluid Pump, Serial No. 181,616, filed March 22, 1962, which is fully incorporated herein by way of reference. The mounting aperture 79 includes annular oil lubricating groove 97, see FIGURES 1 and 4, which communicates both with aperture pluralities 86 and 87 of socket halves 80 and 81 and also with the oil communicating bore 98 which intersects groove 97 in a manner illustrated in FIGURES 1 and 2. It will be noted with reference to FIGURE 2 that the oil scoop 76 is in fluid communication with bore 98. Thus, as the rotor 70 revolves by virtue of the revolution of motor shaft 29, the oil scoop 76 will also revolve and pick up oil disposed within volume 99, which is fed a supply of oil from volume 99 through metering hole 74'', so that during the upward movement of the oil scoop 76 the oil or other lubricant therein will run through bore 98 to groove 97 and from there be pressure fed, as a result of the centrifugal throw due to rotor rotation, to aperture pluralities 86 and 87 of socket halves 80 and 81, and subsequently will be fed via apertures 86 and 87 to apertures 89 and 90 of ball 88 as seen in FIGURE 4. The oil communication will proceed therethrough and through wall apertures 94 of the stub shaft 93 to proceed to lubricate adjacent surfaces of piston 96 and cylinder 51 as illustrated in FIGURE 4.

The stub shaft is advantageously closed at both ends save for the metering aperture 95 communicating with piston 96 and the sludge relief hole 95'. Another type of stub shaft construction is illustrated in FIGURE 5 wherein this new stub shaft 100 includes stub shaft member 101 comprising a tubular construction which is tapered at 102 and which is provided with a welch plug insert at 103. Where necessary the welch plug 103 may include an outlet orifice at 104 as a drain-back to prevent sludge from accumulating. In FIGURE 5 the piston 96 is secured to the stub shaft member 101 by means of an intermediate mounting member 105, the same being welded to piston 96 at 106 and being secured to the stub shaft member 101 by means of washer and bolt attachments 107 and 108. Bolt 108 here may be provided with the lubricating or metering aperture 95 to lubricate the cylinder piston juncture. Shoulder 109 of the hollow stub shaft member 101 seats washer 107 so that the bolt 108 may tighten down the tapered fit of the two, intercooperating members before welch plug 103 is installed. Hence, the welch plug may be removed for replacement purposes and stub shaft 100 detached from intermediate member 105 by the unscrewing of bolts 107. As shown in FIGURE 5, the intermediate member 105 is welded to the piston 96 at weld area 106, for example, or by other means as shown in FIGURES 10C and 10D.

FIGURE 6 in combination with FIGURE 1 illustrates the details of a preferred embodiment of the piston 96, the same includes a cylindrical piston wall 109 having a medial partition 110 and, disposed thereabove, exhaust ports 111 and 112, preferably oppositely disposed. The lower portion 113 of the cylinder 96 is cut away or otherwise relieved to provide for a weld or other type attachment at 114 of stub shaft 93 to piston 96.

Of great importance is the lubrication of ball 88. This is hitherto been discussed in detailed in connection with FIGURES 2 and 3 so that it will be understood that a regular and continuous supply of oil is supplied ball 88 and its journal with the stub shaft 93 in FIGURE 4, for example. (Parenthetically it may be added at this point that the hole 115 is simply a centering hole which is used for establishing centers by which the piston may be machined or ground.)

Intake and exhaust porting will be described in detail hereinafter.

The operation of the equipment thus far described is as follows:

Motor 10 is energized by the electric leads 14, 15 and 16 and revolves the motor shaft 29 which is keyed to rotor 12 through the shaft receiving sleeve 32 pressed therewithin. Optionally included in the construction is a shaft sealing means S, shown in dotted line configuration, which may be secured to the bearing mounting flange 43 and circumferentially engage shaft 29 so that there will not be air-communication through the motor by which the suction generated in the pump portion of the compressor would draw air from fan 23. Also, indications F and F' simply illustrate fins assocated with the rotor 12 in the motor and are conventionally used in standard practice to augment air circulation and cooling of the motor, rotor and the winding thereof.

In any event, the rotation of motor shaft 29 simultaneously produces the rotation of fan 23 which draws air in from direction A and expells the same in a direction B towards the surface of cylinder assembly 51 and displacement plug 47. The cooling fins of both of the latter tend to cool the upper portion of the compressor structure at this point, and the incorporation with fan 23 of the air directing shroud horn 22 is eminently desirable and provides a self-contained unit.

Rotation of motor shaft 29 also produces a rotation of rotor 70. The rotor 70 in revolving produces the reciprocating motion of stub shaft 93 within bearing ball 88 and, correspondingly, as the rotor revolves, there will be a reciprocating translation, back and forth, of the piston 96 within cylinder 51. Further, the action of piston 93 with respect to cylinder 51 will not only be of a translating, reciprocating nature, but also there will be a cyclical, revolvement displacement of piston 96 with respect to cylinder 51 as the piston proceeds back and forth therethrough. This revolvement displacement, transverse to the direction of axial movement of the piston, enables porting of the inlet and exhaust orifices (see 60, 61, 53, and 54 in FIGURE 1) of cylinder 51 with respect to the transversely revolving ports 111 and 112 of the piston which sweep across the cylinder orifices such that suitable intake and exhaust porting thereof is facilitated. This will be explained in enlarged detail hereinafter.

FIGURE 7 is a port timing chart for the structure of FIGURE 1. In FIGURE 7 there will be understood to be 180° of the cylinder rolled out, illustrating a representative one-half of the cylinder 51 wherein is included a plurality of intake orifices 60, 60A, 60B, 60C, 60D, and outlet orifice 53 arranged in the pattern illustrated. Correspondingly, there is also illustrated in FIGURE 7 one of the piston ports 111, see FIGURE 6 and also FIGURE 1, at various locations during the progress of piston stroke.

It will be understood that there will be a similar orifice pattern (corresponding to 60, 60A–60D, and 53) for the remaining half of the cylinder accommodating piston port 112 which is preferably disposed diametrically opposite to piston port 111. 116 identifies an oval which represents a locus or trace of the upper right hand corner of the representative piston port 111 as it proceeds from position A through position J to return to the starting point at top-dead-center position of the piston relative to the cylinder. It is to be noted that, owing to the advantageous 21½° angular relationship with respect to the rotor as depicted in FIGURES 3 and 1, for example, and before explained, the locus 116 will proceed to but never advance beyond 90° of arc sweep about the cylinder. This may be shown either geometrically or arithmetically. Thus, the piston will revolve about its own axis as it reciprocates back and forth within the cylinder to a maximum degree and which will be in line with a cylinder quadrant and will not proceed therebeyond. The same principle of the invention will apply in situations where the angular relationship illustrated in FIGURE 3 is less than 22½°; however, when such reduction is made, then there will be an orifice pattern with respect to cylinder 51 which will be considerably less in girth than that shown in FIGURE 7 and, hence, a design restriction owing to a necessary reduction in hole size will exist. For this reason it is desirous that the 22½° relationship hereinbefore pointed out with reference to FIGURE 3 (and see also FIGURE 1) is deemed advantageous. Thus, a cylinder design may be cut away and the rotor configuration may be such that maximum girth in orifice spacing relative to the minor axis of the oval 116 in FIGURE 7 may be utilized.

With reference to FIGURE 7 it is to be noted that just past top-dead center (TDC) of the piston with respect to the cylinder that piston port 111 will be disposed just beyond cylinder port 53. It is noted that there is a sharp trailing edge 117 with respect to orifice 53 so that a sharp cutoff or registration will exist. Position A of piston port 111 illustrates the situation wherein the exhaust has just been completed and the piston port 111 has moved slightly from exhaust-close position. As the piston continues to revolve during its reciprocating stroke, there will be a position B reached therefor, at which point there will be a registration of the piston port 111 with one of the cylinder intake orifices, namely, 60D. As the piston port 111 continues in a downward counter-clockwise direction, the piston port 111 will in a sequential manner make sequential registration with the cylinder intake orifices 60C, 60B, 60A, and 60 in this manner. Now it will be realized that conceivably a J-configured slot might be used in the cylinder wall so that there will be a continuous registration of piston port 111 through this portion of the cycle. However, to preserve wall strength and bearing surface it is desirable that a plurality of cylinder intake orifices 60 through 60D be utilized, with these holes being spaced as close as possible without deterring desired wall strength. It is to be noted further that the little bridges or bridge segments between the cylinder intake orifices facilitate holding of the cylinder wall so that the stone used in the honing operation of the cylinder will not catch as it would in the slot configuration. It will be noted that at bottom-dead-center position (see the 90° bottom-dead-center point in the diagram of FIGURE 7) that there will commence a closing operation of piston port 111 with respect to the several cylinder ports 60 so that there will be a closing accomplished by a sharp cutoff owing to a sharp trailing edge 118 associated with cylinder orifice 60, thereby enclosing the piston volume between medial partition 110 and the displacement plug 47 in FIGURES 1 and 6.

Continuing, the continued progressive rotation of the piston will return piston port 111 back to top edge center position but out of registry with respect to the several cylinder intake orifices 60, 60A through 60D until the piston port 111 begins its registration with cylinder exhaust orifice 53 as is commencing at piston port position 111 at J. It is to be noted that in this upward travel of the piston, the piston port 111 has been kept at a maximum distance away from the several cylinder intake orifices 60, 60A–60D. This is a further advantage for the 22½° angle innovation hereinbefore enumerated. When, at position J, piston port 111 begins its registration with its respective outlet orifice 53 then, a rapid exhaust of the compressed air or other gas will proceed out of exhaust orifice 53.

It will be noted in connection with FIGURE 7 that the same depicts port timing relationships for pumping compressed air and also for vacuum pumps, and that there is a maximum spacing between cylinder exhaust orifice 53 and the first intake orifice 60D. This precludes undesired leakage between these orifices. In practice, and since rings are preferably not used, it is desired that the clearance between the piston and cylinder be of the order of perhaps .002 of an inch or even less leaving room merely for a lubricant film cushion and seal. Thus, in connection with the pump, it will be noted that leakage loss is dependent not only upon tolerance between the piston wall and the cylinder but also upon the distance between adjacent cylinder orifices which are respectively exhaust and intake orifices. This the present invention accommodates in the manner hereinbefore explained. Again, the spacing between exhaust orifice 53 and the first of the series (60D) of the piston intake ports 60 is to be noted.

In FIGURE 8 is illustrated structure very similar to that shown in FIGURE 1, but wherein this time the motor employed drives a pair of respective pumps by opposite ends of the motor shaft. The motor 10' in FIGURE 8 is similar to the motor 10 in FIGURE 1, however, does include cooling fins 119 and additional mounting flange 120 for mounting the added pump. Pump housings 45' are substantially identical to that illustrated in FIGURE 1; however, they both include cooling fins 121. The cylinders 51' of the two pump units U are substantially identical to cylinder 51 in FIGURE 1, however, do include an alternate position for intake. Thus, instead of the bossed sleeve 66 in FIGURE 1, there is provided a bossed plate 122' which is bolted or otherwise secured to the cylinder 51', preferably with a gasket, and a conduit 68 is affixed thereto in a conventional manner. In effect, the sleeve at 66 in FIGURE 1 will become simply an integral part of the cylinder, and the bossed plate 121 is simply bolted thereto. The bossed plate configuration in FIGURE 8 is ideally suited for vacuum pump work.

It should be noted that for vacuum work, simply from a cost standpoint, but one intake as at 68 in FIGURE 8 will be needed. While but one intake as at 68 in FIGURE 8 is provided, it will be obvious that a pair, one opposite the other, may be provided also; however, for purposes of economy, but one intake connection is needed because one intake alone will afford a full intake during the entire 180° piston down-stroke.

It should be noted at this juncture that for both the FIGURE 1 and FIGURE 8 embodiments, the intake orifice is disposed beneath the exhaust orifices. This is to establish remoteness between the intake and the exhaust orifices and to reduce loss. Another configuration will obtain in the case of handling liquids, and this will be pointed out hereinafter. In the case of FIGURE 8 the motor shaft will simply be journaled in the conventional manner, as is conventional in motors, and the opposite ends of the motor shaft are coupled or integrally affixed to the rotors 70. FIGURE 9 illustrates one manner in which this can be performed. Thus, motor shaft 122 will be splined into mounting flanges 123 which are welded, bolted or otherwise affixed to the rotors 70. Shaft 122 will be keyed by key 124 to the motor rotor 12. A bolt connection is illustrated between rotor 70 and mounting flanges at the left-hand side of the drawing. Welding as at W could also be used as illustrated at the right-hand side of the drawing. Carrier bearings 125 and 126 are respectfully carried in identical respective bearing mounting flanges 43 one of which only is shown. Thus, the energization of the motor will rotate rotor shaft 122 so as to spin rotors 70 in the same direction. As the side movement of rotors 70 must be somewhat restricted, it is desired to affix a ring 209 by screws 210 to bearing mounting flange 43 to hold in place the outer races of each of the control bearings 125 and 126. Bearings 125 and 126 are secured at their inner races to the mounting flanges 123 by virtue of the inclusion of shoulder 127 and snap ring 128 disposed in through 129.

Returning briefly to a consideration of FIGURE 8, it will be noted that, advantageously, the piston associated with one pumping unit U will be at top-dead-center position while the piston associated with the remainder of pumping unit U will be at bottom-dead-center position. Also to be observed is that there may be provided cut-outs 130 in the bearing mounting flanges of the motor so that there will be air-communication through the motor from one pumping unit U to the remaining one. This is particularly advantageous for refrigeration units wherein the pump and motor assemblies are to be hermetically sealed. Thus, where cut-outs are so provided as indicated, then the communication between the bottom areas of both of the pumps will tend to reciprocate such that the air compressed underneath partition 110 with respect to one piston will tend to flow into the reduced pressure area underneath the remaining piston as the two pistons reciprocate in alternating relationship.

Piston 96 in FIGURE 1 is illustrated as being made out of bar-stock as a one-piece unit, with both ends thereof being bored out. Obviously, this will be a somewhat expensive procedure of fabrication. FIGURES 10A through 10D illustrate optional and alternate constructions which will be less expensive to machine and fabricate. In FIGURE 10A it will be noted that the piston 96A includes upper tubular portion 131 and lower tubular portion 132. These tubular portions are interiorly tapered downwardly of the order of ½° minimum, for example, so that the cylinder in approaching top-dead-center position on the upstroke will provide sufficient air passage between displacement plug 47 and the lower interior of the piston above the medial partition thereof so that air escape is unrestricted during the compression stroke. When top-dead-center position is reached, however, the spacing between the displacement plug 47 and the piston will be sufficiently small so as to accomplish the expelling of a maximum volume during the exhaust portion of the stroke. The bottom area of portion 132 throughout the entire circle is tapered at 133 to strengthen the lower portion of the piston construction and to provide a thickened wall area at 134 for accomplishing the welding or other securement of stub shaft 93 thereto. Apertures 111 and 112 are provided in addition, as is also an annular shoulder 135 which seats welch plug 136 in a flattened condition X after the same is preliminarily inserted at condition Y. It will be noted that with reference to FIGURE 10A that the piston is cut away at 137 to eliminate the excess weight material and to provide room for the revolving rotor 70 at the socket area to rotate therewithin. This construction, preferably of steel, assures "lightness" of reciprocation through holding inertia forces to a minimum. Yet, sufficient material at 138 is retained so that the piston area welded or otherwise secured to the stub shaft 93 is of coved configuration, thereby insuring maximum strength of the over-all stub shaft and piston construction in the area of the weld or other attachments used. Once circular rigidity above the relieved area accommodated rotor clearance is established at the lower portion of the piston construction, then the piston construction thereabove may be made as light as possible, taking into account back-pressure on the piston above the medial partition.

The piston 96B in FIGURE 10B is similar to that shown in FIGURE 10A, however, includes a plug 139 which is preliminarily inserted against shoulder 135 as shown at R; subsequently, a tool is inserted to turn down or swedge the plug 39 to a condition shown at S.

Piston 96C in FIGURE 10C is similar to that shown in FIGURE 10B, excepting that this time the upper and lower portions 140 and 141 of the piston are separate parts but are held together by the crimped or swedged plug at 139.

In FIGURE 10D the upper and lower portions 142 and 143, respectively, form separate parts, and a composite plug including ports 144 and 145 may be bolted or riveted together as shown to secure the upper and lower portions 142 and 143 together. To accomplish the same, shoulders 146 and 147 will be supplied.

The lower portions of FIGURES 10A–10D simply indicate various manners by which the stub shaft may be welded to the piston. In FIGURE 10A, for example, welding is accomplished at the front of the structure; in FIGURE 10B, at the rear of the structure; in FIGURE 10C, a ring weld securing intermediate mounting member 105 to the piston, and in FIGURE 10D, simply a butt weld may suffice to join intermediate member 105 with the piston. 115 in the various FIGURES 10A–10D simply indicate centering holes to facilitate machining and grinding of the piston constructions. A centerless grinder might also be used to accommodate grinding of the pistons in FIGURES 10C, 10D when removable, wear sustaining stub shaft member 101 in FIGURE 10C is removed as in FIGURE 10D, where member 105 does not extend beyond the outside diameter of the piston as at X.

There are several things to observe in connection with the piston constructions illustrated in FIGURE 10A through 10C, for example. In the first place, the wall thickness can be of the order of .025 to .040 of an inch thick for a piston sleeve of two inches in diameter. Of course, the thickness of the piston walls should be sufficient to insure that the wall area will not collapse during operation and particularly during intervals when back-pressure thereon is present at the upper section of the piston as a result of the presence of apertures 53 and 54 in the cylinder wall communicating with exhausted gases under compression. It is to be noted that the wall thickness will not have to be appreciable, however, since the cylinder orifices are small, the piston is hardened, and the piston sleeve fits the bore within a clearance of the order of .002 of an inch. To accommodate such a small clearance, the piston should be made of material of roughly the same coefficient of expansion, or less when possible, as the cylinder; for example, the piston may be made of steel, where the design can afford thin-wall sections, and the cylinder of cast iron or other high polish materials such as bronze where adequate cooling is provided therefor to prevent excessive expansion.

As to lubrication, various types of positive oil feeds are familiar, even for heavy equipment, such as positive feed through the cylinder wall, and such could be used here. But whatever lubricating system is used the same will be enhanced as to result by virtue of the rotationally sweeping piston of the present invention. The use of piston rings may be avoided. As to lubrication characteristics of the piston relative to the cylinder, it should be noted that the present design is highly advantageous since the piston describes a rotating motion about its axis within and against the cylinder wall. Thus, there will be an oil film of wide distribution deposited through aperture 95, as a positive feed, onto the cylinder wall and contributed to by oil mist in the housing 45.

The minimal wall thickness of the piston in combination with a distributive oil film between the piston and cylinder wall enables maximum heat transfer to take place so that heat may be conducted from the piston to the exterior. Where heat transfer is rapid, as is present in the instant design, then there is a minimum of heat buildup in the piston proper, thereby insuring that the piston does not swell, so to speak, within the cylinder during compression. Thus, the machining tolerance between the piston and cylinder wall can be held to a minimum amount.

FIGURE 11 illustrates the simple and convenient manner in which the cylinder construction 51 may be cast by the use of a two-piece mold. After the cylinder is cast it can simply be drilled to provide the necessary apertures and ground or lapped interiorly along its axis.

FIGURE 12 is a view taken along the line 12—12 in FIGURE 11, illustrating the construction of the cylinder from a point looking 90° from the direction of viewing in FIGURE 11; the mounting bosses 148 are disposed on either side of the cylinder construction, and bossed plates 122" (similar to 122' in FIGURE 8) are bolted to the cylinder construction over the area enclosed by well 211 which communicates with the intake orifices 60, 60A–60D. FIGURE 12 simply illustrates that since each side of the operating cylinder assembly is symmetrical with each other, and that two intakes may be used instead of just one. For economy purposes, however, since the entire 180° down-stroke is used or may be used for intake, there will be an ample air intake, for example, drawn in to accommodate the compression stroke without an additional intake path. However, such may be provided if necessary.

Rather than cooling fins, there may be employed a water jacket construction as is shown in FIGURE 13. Cylinder 149 is similar in all other respects to cylinder 51 in FIGURE 11, but this time, instead of employing cooling fins, the same includes a waterjacket sleeve 150 which is pressed over O-ring seals 151, 152, and 153 and 154, the latter disposed in groove 154', in order that a water area H may be supplied as well as an isolated area I for which is provided boss 155 and intake orifice 156. Box 157 and its O-ring 154 will of course contact the sleeve 150 so as to permit an external fitting to be threaded in the former.

FIGURES 14, 15 and 16 illustrate a pumping unit, a compressor or vacuum pump, similar to FIGURE 1 but which is motor-driven by a motor coupled to the pumping unit by a simple V- belt drive. Inspection plates 158 and 159 are secured to the pump housing 145 by means of screws 160, and an oil breather 212 can be supplied where necessary. Shaft 161 is journaled within bell housing 162 in a manner as illustrated in FIGURE 17. Where necessary, a fly-wheel 163 may be keyed at 212 to the shaft and employed in a conventional manner. Sheave 164 is likewise keyed to shaft 151 in any conventional manner and driven by motor 165 via a V-belt 166. It is preferred that the fly-wheel 163 have spoke-fins 167 so that when the fly-wheel is disposed close to the pumping unit U, illustrated in FIGURE 14, the fins 167 will direct air against such unit for cooling purposes.

In turning our attention to FIGURE 17 it can be seen that the bell housing 162 is shouldered at 168 for receiving carrier bearing 169, with the latter locked to position at its inner race by locking unit 171 threaded upon shaft 172 at threaded area 173 and thrustingly engaging the hub 204 of fly-wheel 170, coned if desired, the latter being disposed upon and keyed to draft 172 by key 205. See also FIGURE 18. The shoulder 168 is properly machined to accommodate a shim 203 which abuts the shoulder 168 to accommodate slight pre-load of the bearing 169 at its outer race and its companion bearing 178. The shim 203 could also have been used in conjunction with bearing 178 to pre-load both of these carrier bearings.

Bearing mounting flange 174 is shouldered at 175 for receiving the second carrier bearing 178, and bearing mounting flange 174 is secured to inner member 162 by cap bolts 180. 181 simply comprises a spacer sleeve spacing the inner races of bearings 178 and 169. Bearing 178 abuts the shoulder at 182 of the shaft 172 as shown. The rotor construction 70 is exactly the same as previously described, with the slight possible exception of the oil scoop 76 being moved somewhat to the left relative to the position shown in FIGURE 1; however, the operation and configuration of all the parts will be identical or substantially so. The oil scoop 76 in FIGURE 17 is simply secured to the rotor 70 by means of screws 183 and 184.

Piston member 185 includes, in effect, a pair of opposed pistons 186 and 186' which are identical and integral with respect to each other. Medial partitions 110 are disposed in the respective pistons 186 and 186' as previously indicated in the general configuration shown in FIGURE 10A, for example. Displacement plug 187 in the main, in each of the two cylinders 189, is similar to that illustrated in FIGURE 1, minus the cooling fins where such are not needed. Plug 187 is secured by cap bolts 188 to the cylinder 189, and includes small relief areas 176 to augment final exhaust flow during the exhaust portion of the stroke. Usage of relief areas 176 will be dicitated by the closeness of fit between plug and piston for any given application. Pump housing 179 is secured by means of cap bolts 190 to each of the two cylinders 189 at opposite extremities thereof. Cylinder exhaust orifice 191 interiorly receives fluid communicating exhaust conduit 192 in a conventional manner. Boss 193 receives conduit 194, to accommodate cylinder passageway 212 communicating with cylinder intake orifice 197, and is made an integral part of cylinder 189. The construction of the two cylinders 189 is or may be identical.

FIGURE 18 is an end view taken along the line 18—18 in FIGURE 17 to show the general outline configuration of the unit of FIGURE 17. Where there is present a two-cylinder construction as is illustrated in FIGURES 17 and 18, then the two-cylinders should be diametrically opposed and lie in a horizontal plane. Thus, it will be noted that the two cylinders, when used to pump non-compressible fluid, may be driven by single shaft 172 or, in turn, the unit may be used as a prime mover energizable by the introduction of compressed air, steam, or other compressible or non-compressible fluid at intake or input orifice 194 for producing the rotation of output shaft 172.

Porting in connection with FIGURES 17 and 18 is shown in FIGURES 19 and 20 which will be shortly discussed. It should be noted that the porting necessary to accommodate the equipment of FIGURES 17 and 18 as a prime mover, wherein input energy is supplied to rotate revolvable shaft 172 as an output shaft, is to be differentiated from the porting in the present invention wherein the structure is to be used as an air compressor, for example, as shown in FIGURE 1. It will be noted, and particularly with reference to FIGURES 1, 7 and 10A–10D that the primary characteristic of porting in connection with the air-compressor structure is that the exhaust ports provided are always disposed above and immediately adjacent the medial partition 110 (see FIGURE 1). Almost always, two exhaust ports will be used in diametrically opposed relationship to balance back-pressure which will be imposed upon the piston. Coincident with this is the further characterization that in air-compressors the cylinder exhaust orifices 53 and 54 (see FIGURE 1) will register at top-dead-center with the aforementioned piston ports 111 and 112, while the cylinder intake orifices (60, 60A–60D, see FIGURE 7) will be disposed below the exhaust orifices in the cylinder wall. It has been heretofore explained that in the air compressor situation the plurality of intake orifices in the cylinder walls are caused to register sequentially with the intake ports of the piston as the latter follows its movement.

In connection with the prime mover or non-compressibles pumping situation, for example, of FIGURES 17 and 18, however, the intake ports in the piston are disposed as illustrated in FIGURES 19 and 20. Thus, it is seen that representative piston 186, shown in fragmentary view, includes piston intake ports 195, 195A, 195B, 195C, and 195D in FIGURE 19. A plurality of exhaust ports, generally corresponding in sweep pattern of reverse orientation, will be disposed on the opposite side of the piston 186 as illustrated in FIGURE 20. These latter ports will be identified as 196, 196A, 196B, 196C, 196D, 196E.

FIGURES 21 through 24 illustrate a roll-out of the piston wall of piston 186 superimposed over a roll-out of the cylinder wall of cylinder 189. 191 and 197 respectively designate the cylinder exhaust orifice and the cylinder intake orifice. These are shown in dotted lines since they are "underneath" the piston wall. In similar vein, the piston wall includes ports 195, 195A–195D as one series and, as a second series on the opposite side thereof, ports 196, 196A–196E. At top-dead-center position as illustrated in FIGURE 21 the cylinder intake orifice 197 is out of registry with all of its respective piston ports 195, 195A–195D and, correspondingly, cylinder exhaust orifice 191 is out of registry with the series of piston ports 196, 196A–196E.

Figure 22:
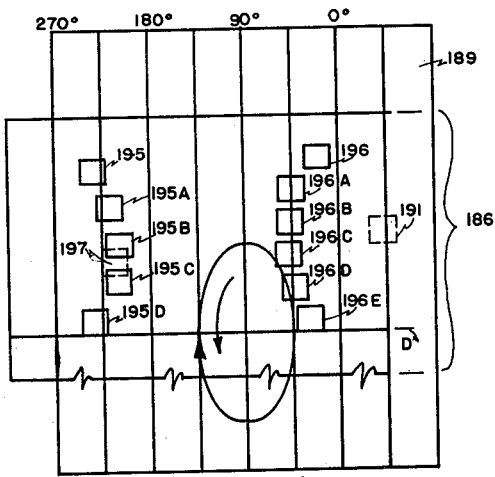

During the down-stroke the piston advances downwardly and rotates at the same time and, as shown in FIGURE 22, at 9 o'clock position or mid-downstroke the cylinder intake orifice 197 is seen to register successively with piston ports 195B and 195C. This is to say, as the piston moves downwardly there is a progressive registration of the cylinder intake orifice 197 with the piston ports 195, 195A–195D so that there is a successive registering of this orifice ports, successively, until bottom-dead-center position has been reached, at which point it is seen that the cylinder intake orifice 197 will be out of registry with piston port 195. It is to be noted that by virtue of the configuration of the remaining piston ports 196, 196A–196E, that there has not been any registry whatever of the cylinder exhaust orifice 191 with any of the piston exhaust ports 196, 196A–196E. When, however, the piston proceeds in its upstroke from bottom-dead-center position as in FIGURE 23 to 3 o'clock position in FIGURE 24 and ascends upwardly, it is seen that there is a successive registry of the cylinder exhaust orifice 191 with piston exhaust ports 196E, 196D, 196C through 196A and 196, progressively. Thus, the first series of ports (195, 195A–195D), is employed as intake ports whereas the second series of ports 196, 196A–196E in the same piston is used for exhaust purposes. Such a construction is ideally suited for the reception of compressed air, steam or other means at 197 and exhaust thereof at 191 to drive the output shaft 172 in FIGURE 17.

As noted in FIGURE 21, top-dead-center position, the cylinder intake orifice 197 is just coming into registry with the lowermost piston port 195D. Correspondingly, the cylinder exhaust orifice 191 has just come out of registry with piston exhaust port 196E.

There is typified in the above a "true" theoretical port timing relationship in these drawings. Of course it is to be understood that various deviations may be made from the port and orifice patterns illustrated to accomplish lead and lag of a desired type in accordance with the practice of the invention. Thus, for example, if steam were used to drive the prime mover of FIGURE 17, the porting and orifice relationships illustrated in FIGURES 21 through 24 could conceivably be varied such that the piston port 195 would be eliminated, so that intake would be cut off at say 4 o'clock position. However, all of the exhaust ports 196, 196A–196E may well be required in eliminating all of the steam on the upstroke (unless a small amount is desired as a recoil action once top-dead-center has been reached in which case 196 would not be present).

In the drawings FIGURES 21 through 24 the designations D—D correspond to similar designations D—D in FIGURE 17, wherein the same indicates the top surface of the partition 110 of whatever form. The numeral 186 is bracketed and illustrates principally the upper piston half 186 (186' is identical) associated with the rolled-out cylinder 189. FIGURES 21 and 23 illustrate top-dead-center and bottom-dead-center positions, respectively. FIGURES 22 and 24 illustrate 9 o'clock and 3 o'clock positions, respectively, assuming a counter-clockwise direction of progress as the piston proceeds from top-dead-center down to bottom-dead-center on the down-stroke and then back to top-dead-center on the compression stroke.

FIGURE 25 is a sectional view of the construction when taken along the lines 25—25 of the roll-out illustrated in FIGURE 21. The cylinder 189 includes cooling fins 198 and 199, for example. Areas 200 and 201 correspond to the break line in the section line 200 indicated in FIGURE 21.

It will be understood that the cylinder construction 189 as illustrated at the bottom half of FIGURE 17 will operate in an identical manner to that shown in the top half of the figure.

FIGURE 26 illustrates the situation wherein there may be two opposed cylinders 51 driven on each side of a motor 10'. Thus, a single electric motor 10' may be used to drive at both extremities of the shaft 122 thereof a pair of opposed cylinders, making four compression units all which may act in concert or in any other way desired to compress gaseous materials.

The unitary, composite, piston and double-cylinder 189 construction of FIGURE 17 with the porting arrangement of FIGURES 19 through 24 may be utilized in FIGURE 29 to pump non-compressible fluids such as liquids, as in FIGURE 29, or to drive a generator 202 (see FIGURE 27) by either compressible or non-compressible materials (gases or liquids).

Except as above noted, the construction illustrated in FIGURES 26 and 29 will follow that shown in FIGURES 1 and 9 as illustrated, as relating to the motor shaft 122 of motor 10' (corresponding to motor shaft 29 of motor 10 in FIGURE 1).

In FIGURES 27 and 28 the rotor 206 of generator 202 is keyed at 205 to shaft 122, as also shown in FIGURE 9, and shaft 122 may enjoy the same journal mountings as are illustrated in FIGURE 9, and/or may employ a sleeve journal as at sleeve 207, see FIGURE 27, within shaft housing 208. The structure may be fluid driven, through the employment of cylinders 189, by gas, compressed air, steam, or liquid.

It has been seen from the foregoing that the present invention lends itself to a wide variety of embodiments which embrace substantially the entire volume displacement field. This is to say, wherever volume displacement equipment is used, either as prime movers for performing useful work, of which fluid driven motors and motor generators are merely examples, or whether the volume displacement equipment takes the form of vacuum pump, compressors, and in fact pumps of all types of compressible and non-compressible material, the present invention will apply. Its essence resides in the provision of a piston which responds to or corresponds with the revolvement of a rotor such as a shaft or other equipment by exhibiting in itself a composite working motion which itself is made up of two distinct motions which take place simultaneously, i.e., the cyclical reciprocating motion of a conventional piston operating in a cylinder and a corresponding and simultaneously occurring cyclical revolvement or revolving displacement in the form of a lapping or a sweeping motion of the piston relative to its cylinder. The former motion component provides volume displacement so that the work desired (such as compressing or pumping) can be performed; the latter motion component provides a self-contained porting or valving of the equipment so that the intake in exhaust necessary for the particular work to be performed can be accomplished, and this without the utilization of separate valve attachments or other mechanization. The lapping or sweeping movement of the piston within the cylinder affords an ideal cylinder, piston environment which in most applications will render the employment of piston rings unnecessary. There is an added advantage in this the present invention, since by the employment of controlled lubricant application in the space defining piston cylinder clearance, wear will be minimized, maximum heat transfer will be effected from the piston through the lubricant film to the cylinder, and, further, a lubricant seal against medium leakage between valving ports and orifices is afforded. The design of the invention readily lends itself to optimum sealing-off of ports and orifices during stroke intervals when such is needed. A number of desired instruction details have been given in connection with piston and cylinder construction, lubrication, port and orifice spacing of the piston and cylinder, determination of rotor configurement, which render the practice of the invention eminently practicable for a variety of uses. Thin wall construction of the piston employed is made practical, with the construction employed at the base thereof rendering the same suitable for a motion transforming drive which is provided the equipment. Air access means is supplied the equipment for both heremetically sealed and other types of units.

Various contexts of usages of the present invention have been given in the drawing. The structure in FIGURE 1, for example, is ideally suited for vacuum pump and compressor work. The porting thereof is illustrated principally in FIGURE 7. FIGURE 17 illustrates a construction wherein the same may be used either as a prime mover to supply an output drive, which can be run by compressed air, steam, or other compressible material, and also illustrates that the same may be externally driven through its revolvable shaft as a pumping unit for fluid or other non-compressible materials. Conceivably, non-compressibles can be accommodated where the shaft 172 in FIGURE 17 is being driven by an external source. It will be noted that the porting of the structure in FIGURE 17 is illustrated in FIGURES 21 through 24, principally, the operation of which has been hitherto described and is to be differentiated from that shown in FIGURE 7.

FIGURES 15 through 17 illustrate the unit as being externally driven and being operated as a vacuum or compression pump.

FIGURES 27 and 28 illustrate the invention as taking the form of a motor generator wherein one, two, or, as shown, four cylinders bearing porting relationships as shown in FIGURES 17 and 21 through 24, may be used to drive an electrical generator.

FIGURES 26 and 29 illustrate the invention used as a multi-stage compressor or vacuum pump provided with a centrally located electrical motor driving two sets of opposed pistons. In the case of FIGURES 26 and 29, one two, or four of such cylinder constructions may be driven and their outputs combined, if desired, in any way desired and for any sequence-spacing needed by the work to be performed.

Various piston and connecting means structures have been illustrated, as in FIGURES 10A-10D to show that the same may be fabricated easily and inexpensively and, if desired, may be disassembled for purpose of part replacement and easy maintenance.

Hermetically sealed units such as the double-cylinder unit of FIGURE 8 may be used as hermetically sealed refrigeration pumps.

The ball and socket articulated joint receiving the connecting means or stub shaft of the motion transforming mechanism of the invention is highly desired in use and the essential lubrication thereof has been dealt with extensively in the discussion of FIGURE 1 in conjunction with FIGURES 2 through 4. It is conceivable that other types of articulated connections by which the rotor may receive the "connecting means" or stub shaft of the motion transforming device may be provided; what is essential in this area of the invention is that the revolvement of the rotor as its characteristic motion is adapted to produce the reciprocating and sweeping motion of the piston to which it is connected, or vice versa.

It is further to be noted that an extra long "skirt" segment is provided the piston in the present volume displacement structure which is suitably provided a relief area accommodating rotor revolvement of the motion transforming mechanism so that articulated coupling by the rotor through the connecting means to the piston may be made sufficiently close to the piston such that angular thrust on the piston comes within acceptable operating limits.

A final general observation to be made is that by virtue of the very light construction made possible through the present design of the reciprocating assembly, rotor and revolving shaft, that inertia forces may be held to a minimum and friction loss also, this in contra-distinguishment of conventional reciprocating pistons with their necessary crank shaft, connecting rods, wrist pins and so forth.

It is to be remembered that the present invention is especially suited for high speed operation, accommodated by the valving of the structure as hereinbefore explained, which is turn further reduces leakage tendency so that pump efficiency is maintained at a high level.

The present invention will also be adopted for internal combustion work.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Volume displacement apparatus with sleeve valve control, said apparatus including, in combination: a cylinder; a piston operatively disposed in said cylinder and having a characteristic motion with respect to said cylinder of cyclical reciprocation and simultaneous, correspondingly cyclical sweeping revolvement within said cylinder; a rotor spaced from the axis of reciprocation and revolvement of said piston, journaled for revolvement about an axis which is transverse with respect to piston orientation, and having a characteristic motion of revolvement; socket means disposed in said rotor eccentrically with respect to the axis of revolvement of the latter, a ball universally received by said socket means in a ball and socket joint, said ball having a central bore, stub shaft means rigidly secured to said piston and journalled in said central bore of said ball, said piston and cylinder being provided with port means and orifice means, respectively, which are registerable during predetermined periods of piston stroke, said piston and cylinder being so oriented with respect to one another as to effect passage through said port and orifice means, upon a first unique registration thereof, through said cylinder and into said piston during one portion of piston stroke and, subsequently, upon a second unique registration thereof, from said piston back through said cylinder during another portion of piston stroke, of selected materials employed in connection therewith, to effect desired work.

2. Structure according to claim 1 wherein said piston, rotor, ball, socket and stub shaft are so oriented in respect to one another that said socket is axially oriented at an angle of nominally 22½° relative to the axis of said stub shaft throughout the entire stroke of said piston.

3. Structure according to claim 1 wherein said connecting means and piston are provided with intercommunicating lubricant passageway means for receiving lubricant and for passing the same to the surface of said cylinder adjacent said piston.

4. Structure according to claim 1 wherein said volume displacement apparatus includes a motor having a shaft coupled to said rotor, an air fan coupled to said shaft, shroud means fixedly disposed with respect to said motor for directing air from said fan to and across said cylinder, and air sealing means disposed between said rotor and said fan.

5. Structure according to claim 1 wherein said stub shaft means comprises a stub shaft journaled in said central bore of said ball and an intermediate mounting member rigidly affixed to said piston, and means releasably securing said intermediate mounting member to said stub shaft member.

6. Structure according to claim 1 wherein said volume displacement apparatus includes a housing contiguous with and communicating with said cylinder and disposed beneath said cylinder and rotor, encasing the latter, said rotor also including a lubricant scoop, said housing including a baffle partition means, disposed in a plane between said lubricant scoop and said piston, for isolating turbulence produced by said lubricant scoop from said piston, said baffle partition means being provided with aperture means offering metered communication for lubricant return flow through said baffle partition means.

7. Structure according to claim 6 wherein said lubricant scoop, rotor member, socket means, and ball include intercommunicating lubricant passageway means for centrifugally, lubricant-pressure-feeding said ball.

8. Structure according to claim 1 wherein said rotor includes an oil scoop, said oil scoop, rotor member, socket means, ball, stub shaft means, and piston including intercommunicating passageway means for centrifugally pressure lubricating said ball within said socket means and said stub shaft means within said ball, and for control-lubricating said piston within and relative to said cylinder.

9. Structure according to claim 1 wherein said volume displacement means includes a housing, at least the lowermost portion of said cylinder being disposed within said housing, said piston and cylinder being relieved at their lowermost portions for accommodating rotor proximity to the axis of reciprocation of said piston, said rotor revolving, at its juncture with said connecting means, within said piston and cylinder lowermost portions which are so relieved.

10. Structure according to claim 9 wherein said lowermost portion of said cylinder is elongated at its non-relieved area at least to the downstroke extremity of said piston.

11. Structure according to claim 10 wherein the transverse cross-section of said cylinder at its lowermost portion is coved about said piston in degree greater than 180° of arc.

12. Structure according to claim 1 wherein said piston is open-ended at both ends and is provided with a medial transverse, closure partition, said volume displacement apparatus including a displacement plug affixed to and closing said cylinder and protruding therewithin, said displacement plug being spaced from the inner wall of said cylinder, with respect to its protrusion therewithin, to admit the travel therebetween of said piston.

13. Structure according to claim 12 wherein the spacing between said piston and said displacement plug is conically tapered away from said medial, transverse, closure partition, and wherein at least a part of said orifice means of said cylinder is disposed at a position just above said piston medial, closure partition when said piston is at top dead center position, at least a part of said piston port means registering with said cylinder orifice part at top dead center position, said displacement plug extending to proximity with said piston medial closure partition and said piston port means part and being relieved at its proximity with the latter.

14. Structure according to claim 12 wherein at least a part of said orifice means of said cylinder is disposed at a position just above said piston medial, closure partition when said piston is at top dead center position, at least a part of said piston port means registering with said cylinder orifice part at top dead center position, said displacement plug extending to proximity with said piston medial closure partition and said piston port means part, a remaining part of said cylinder orifice means being disposed beneath said piston medial closure partition, and conduit means disposed in communication with said remaining part of said cylinder orifice means.

15. Structure according to claim 14 wherein said remaining part of said cylinder orifice means comprises a plurality of orifices arranged in an arcuate pattern.

16. Volume displacement apparatus with sleeve valve control, said apparatus including, in combination: a pair of opposed cylinders; a pair of opposed pistons respectively operatively disposed in said cylinders and having a characteristic motion with respect to said cylinders of cyclical reciprocation and simultaneous, correspondingly cyclical sweeping revolvement within said cylinders, said piston being integral with each other; a rotor spaced from the axis of reciprocation and revolvement of said pistons, journaled for revolvement about an axis which is transverse with respect to piston orientation, and having a characteristic motion of revolvement; socket means disposed in said rotor eccentrically with respect to the axis of revolvement of the latter, a ball universally received by said socket means in a ball and socket joint, said ball having a central bore, stub shaft means rigidly secured to said piston and journalled in said central bore of said ball, the respective pistons and cylinders being provided with port means and orifice means, respectively, which are registerable during predetermined periods of piston stroke, the said pistons and their respective cylinders being so oriented with respect to one another as to effect passage through said part and orifice means, upon a first unique registration thereof, through a respective one of said cylinders and into its piston during one portion of piston stroke and, subsequently, upon a second unique registration thereof, from such piston back through said respective one of said cylinders during another portion of piston stroke, of selected materials employed in connection therewith, to effect desired work.

17. Volume displacement apparatus with sleeve valve control, said apparatus including, in combination: a cylinder; a piston operatively disposed in said cylinder and having a characteristic motion with respect to said cylinder of cyclical reciprocation and simultaneous, correspondingly cyclical sweeping revolvement within said cylinder; a rotor spaced from the axis of reciprocation and revolvement of said piston, journaled for revolvement about an axis which is transverse with respect to piston orientation, and having a characteristic motion of revolvement; socket means disposed in said rotor eccentrically with respect to the axis of revolvement of the latter, a ball universally received by said socket means in a ball and socket joint, said ball having a central bore, stub shaft means rigidly secured to said piston and journalled in said central bore of said ball, said piston and cylinder being provided with port means and orifice means, respectively, which are registerable during predetermined periods of piston stroke, said piston and cylinder being so oriented with respect to one another as to effect passage through said port and orifice means, upon a first unique registration thereof, through said cylinder and into said piston during one portion of piston stroke and, subsequently, upon a second unique registration thereof, from said piston back through said cylinder during another portion of piston stroke, of selected materials employed in connection therewith, to effect desired work, said cylinder orifice means comprising a plurality of cylinder intake orifices, successively registerable with said piston port means on piston downstroke, and at least one cylinder outlet orifice registerable with said piston port means on piston upstroke.

18. Structure according to claim 17 wherein said series of intake ports are mutually disposed on opposite sides of said piston.

References Cited in the file of this patent

UNITED STATES PATENTS

| | | |
|---|---|---|
| 1,034,592 | Dourte | Aug. 6, 1912 |
| 1,036,797 | Castle | Aug. 27, 1912 |
| 1,125,483 | Dalzell | Jan. 19, 1915 |
| 1,576,571 | Carrey | Mar. 16, 1926 |
| 1,663,927 | Voreaux | Mar. 27, 1928 |
| 1,673,191 | Gille | June 12, 1928 |
| 2,436,683 | Wood | Feb. 24, 1948 |
| 2,603,158 | Nemetz | July 15, 1952 |

FOREIGN PATENTS

| | | |
|---|---|---|
| 804,166 | France | Oct. 17, 1936 |